United States Patent [19]

Tatro et al.

[11] Patent Number: 5,344,240
[45] Date of Patent: Sep. 6, 1994

[54] BEARING SYSTEM FOR AUTOMOTIVE ALTERNATORS

[76] Inventor: Tommy T. Tatro, Rte. 1, Box 180, Okmulgee, Okla. 74447; Donnie W. Duncan, 901 West Gentry, Henryetta, Okla. 74437; Robert S. Tatro, 1340 North Kern, Okmulgee, Okla. 74447

[21] Appl. No.: 875,965

[22] Filed: Apr. 29, 1992

[51] Int. Cl.⁵ .................. F16C 33/58; F16C 35/07
[52] U.S. Cl. ........................ 384/569; 384/584; 384/626
[58] Field of Search .......... 384/445, 519, 537, 559, 384/569, 584, 585, 581, 582, 626

[56] References Cited

U.S. PATENT DOCUMENTS 2,244,197  6/1941  Hessler ................. 384/569
2,826,462  3/1958  Evans .................. 384/519

FOREIGN PATENT DOCUMENTS 1254915 11/1967 Fed. Rep. of Germany ...... 384/569
1047719 12/1953 France ...................... 384/585
 133438 10/1951 Switzerland ................ 384/584
 168666  9/1921 United Kingdom ............ 384/585
 684867 12/1952 United Kingdom ............ 384/585

Primary Examiner—Thomas R. Hannon
Attorney, Agent, or Firm—Catalano, Zingerman & McKay

[57] ABSTRACT

A bearing system for automotive alternators comprising a draw cup needle bearing, a bearing journal or spacer to accommodate this needle bearing onto the alternator shaft, and a bearing sleeve to fix the bearing system into the alternator housing.

3 Claims, 1 Drawing Sheet

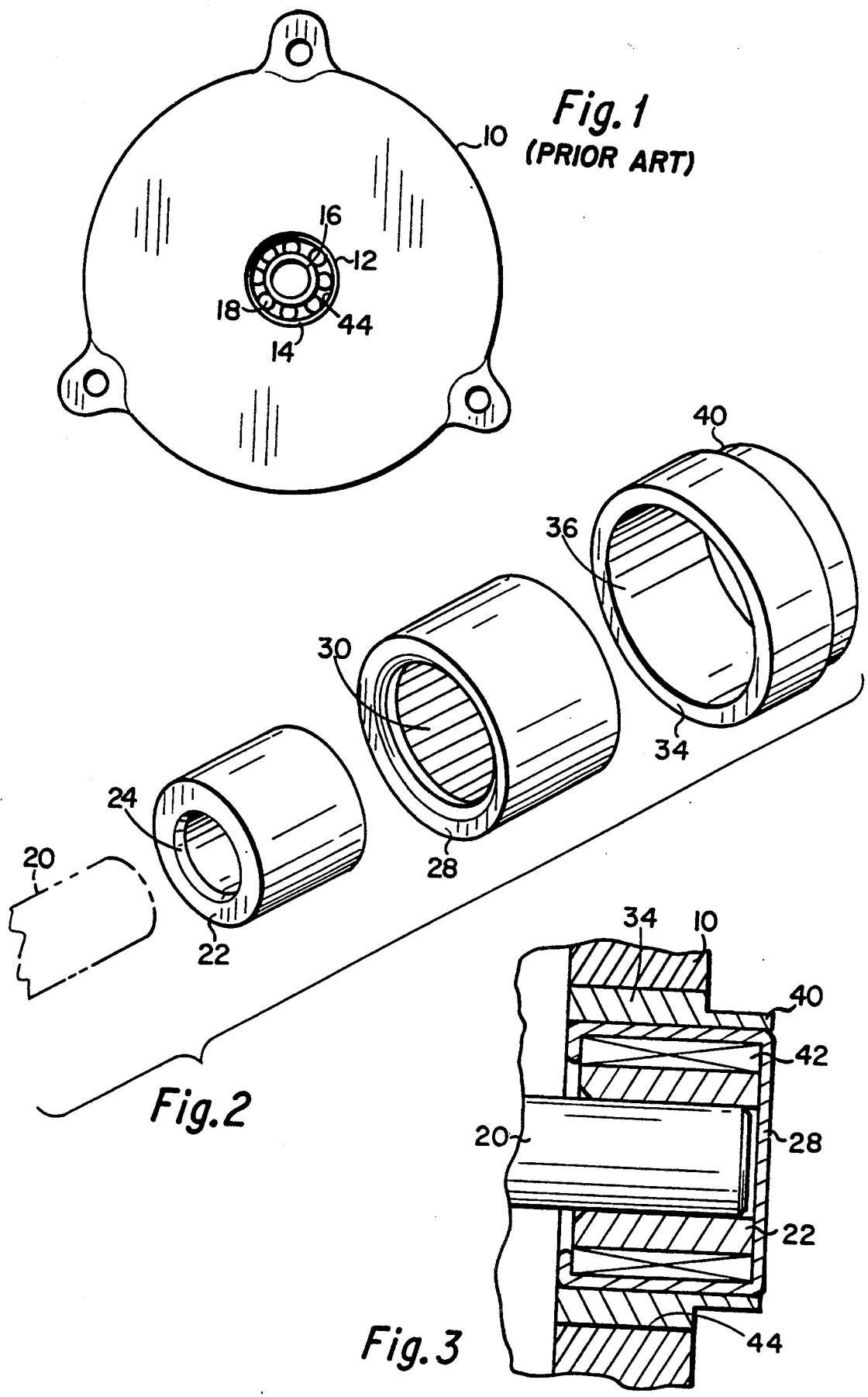

BEARING SYSTEM FOR AUTOMOTIVE ALTERNATORS

BACKGROUND OF THE INVENTION

1. Field of the Invention

This invention relates to a method for rebuilding a bearing system for automotive alternators.

2. Description of the Related Art

A problem has developed in the industry involving the Delco CS Series alternator adapted for General Motors cars and light trucks. These alternators area commonly called the CS 121 and the CS 130 alternator.

The problem is the failure rate of the slip ring end bearing, known in the industry as a 6000 class bearing, which is located at the rear of the alternator. General Motors requires the alternator drive belt to be tightened to very high tension (e.g. 125 ft-lbs.). This high tension is transmitted down the alternator shaft to the end bearing at the rear end placing a great radial load, as well as some thrust load upon this bearing. When placed under this load, the 6000 bearing inner race becomes out-of-round and failure occurs. In the industry, therefore, a need exists for a stronger long lasting bearing for this application. It has been calculated that as high 17% of these alternators installed as original equipment since 1985 have failed out of more than six million presently on the road. This figure may increase as additional driving mileage accumulates.

When the end bearing race begins to wear out of round, and well before failure, the alternator rotor begins to make an elliptical orbit which causes vibration. This vibration, in turn, may cause the internal voltage regulator to fail. The elliptical orbit of the rotor (which has about 0.014 in. clearance from the stator) causes it to rub on the stator thereby causing eventual failure of both the rotor and the stator.

When the end bearing fails completely, the alternator will lock up causing vehicle break-down. Lock up of the alternator may cause additional damage to other vehicle components.

The CS Series alternator was originally promoted as a "throw-away", or unrebuildable component. In practice, however, these alternators are being routinely rebuilt. In the industry, automotive alternator rebuilders are experiencing as high as 40% failure rate of rebuilds that leave the shop, mostly due to repeat end bearing failure, even though the original bearings had been replaced.

SUMMARY OF THE INVENTION

This invention relates to an apparatus and method for rebuilding an alternator having a slip ring end bearing fixed to the alternator shaft and press fit into the alternator housing. This present invention is very advantageous for Delco CS Series alternators used extensively in General Motors automobiles since 1985 in order to solve an end bearing failure problem presently being experienced in the industry.

In this new system, the slip ring end bearings (roller bearings) commonly used are replaced by a draw cup needle bearing with a larger diameter inner race than that of the original bearings. This provides an improved bearing assembly. This requires use of a conversion assembly so that this bearing with a larger diameter inner race can be used in existing alternators. This conversion assembly includes a bearing journal designed to press fit over the shaft of the alternator and fit inside the new and larger draw cup needle bearing.

In order for the improved draw cup needle bearing to be properly fixed in the alternator housing, a novel bearing sleeve has been designed which is pressed flush with the interior of the alternator housing. The cup bearing is inserted into this sleeve. The outer race of the bearing is thereby in contact with the cup bearing sleeve. The bearing journal is secured to the shaft and rotates with it. The outer surface of the bearing journal is in rolling contact with the needle rollers within the cup bearing. In operation this generates less heat from that generated in the prior art alternator and in general provides for an improved bearing system for the rebuilt alternator.

An object of this invention is to provide an improved bearing system for automotive alternators.

Other objects and a better understanding of the invention can be had from the following description taken in conjunction with the drawings.

BRIEF DESCRIPTION OF THE DRAWINGS

FIG. 1 is a side view of an alternator housing containing a prior art slip ring end bearing.

FIG. 2 is an isometric exploded view of the bearing system of this invention depicting how its elements relate to the alternator shaft.

FIG. 3 is a cross-sectional view of the present invention installed on an alternator shaft shown press fit into the alternator housing.

DETAILED DESCRIPTION OF THE PREFERRED EMBODIMENT

This invention involves replacing the existing slip ring end bearing assembly of an automotive alternator with an end cup needle bearing assembly having a larger diameter inner race. FIG. 1 is an end view of an automotive alternator illustrating the prior art bearing assembly presently found in many cars. Alternator housing 10 has a slip ring end bearing 12 press fit into a support hole 44 therein. The size of support hole 44 is a diameter so that outer race 14 of bearing 12 can be press fit therein.

The inner race 16 of end bearing 12 is of a required diameter to receive the shaft of a traditional automotive alternator which extends horizontally through the alternator and terminates at end bearing 12. It can be seen that as the alternator shaft rotates, bearing 12 will rotate inside housing 10 at the same r.p.m. as the shaft. If the alternator shaft is slightly skewed on the horizontal axis within the alternator, as is very common in the industry, this condition will cause the outer race 14 of ball bearing 12 to become out of round thereby causing bearing, and subsequently alternator, failure. The individual stainless steel balls 18 of the bearing 12, are pressed hard against the outer race 14 at one position or area due to excessive and uneven radial load at that area. This causes excessive wear and a channel to develop which causes the bearing to fail more rapidly.

In FIG. 2, the elements of the present invention are shown as they relate to one another. Shaft 20 extends through the typical automotive alternator and terminates at the alternator housing 10 at the position shown in FIG. 1. Draw cup needle bearings are known in the industry and can be obtained from commercial sources. In the present invention, the slip ring end bearing 12 of FIG. 1 is replaced by the draw cup needle bearing 28 of FIG. 2 which has an inner diameter much larger than that of the original end bearing. The concept and configuration disclosed herein makes this transition possible. This is most important. By using the draw cup needle bearing 28, we have over 15% larger bearing diameter over the slip ring end bearing 12. When the bearing is larger, there is more surface contact with the shaft which allows heat to dissipate much more readily thereby greatly extending the life of the bearing.

As can be seen from FIG. 2, in this invention the internal surface 30 of needle bearing 28 is of a larger diameter than shaft 20. In order to fix bearing 28 onto shaft 20, a bearing journal 22 is press fit onto shaft 20. The diameter of the internal surface 24 of bearing journal 22 is the same as the diameter of shaft 20 to permit this press fit. Bearing journal 22 has an external diameter to fit into the inner race 30 of needle bearing 28. The use of bearing journal 22 allows a larger bearing to be used than that presently in use with existing alternators.

After bearing journal 22 is press fit onto shaft 20, bearing sleeve 34 is press fit into housing 10 to the position shown in FIG. 3. Bearing sleeve 34 is press fit into the alternator housing. The external casing of bearing sleeve 34 contains a guide 40 which allows it to fit flush with the inside wall of housing 10 of the alternator at the position shown in FIG. 3. It is possible that the alternator housing hole may have to be enlarged to receive bearing sleeve 34 in some installations. After bearing sleeve 34 is fit into housing 10, bearing 28 is press fit into bearing sleeve 34. Housing 10 is then placed on the alternator so that bearing journal 22 fits into bearing 28.

FIG. 3 depicts a cross-sectional view of the bearing system disclosed herein when installed in a CS Series alternator. This bearing system replaces the slip ring end bearing, as shown in FIG. 1, presently used for this purpose. It can be seen from the drawing that the introduction of bearing journal 22 allows the use of a bearing 28 with a larger diameter inner race. This is important. Bearing journal 22 is press fit onto the shaft 20 and fitted into bearing 28. In this manner, bearing journal 22 becomes the inner race of the draw cup needle bearing 28. It is understood by those skilled in the art that bearing 28 can be any type bearing suitable for this bearing application that would fit with bearing journal 22 and sleeve 34. It is also understood that bearing journal 22 can be of any size necessary to accommodate the use of bearing 28 with an inner race of a diameter larger than the shaft 20 of the alternator. It is obvious to one skilled in the art that the bearing system disclosed herein can be used in automotive alternators other than the Delco CS Series.

Rollers 42, contained within needle bearing 28, contact the outer surface of bearing journal 22 over a large surface area and thereby dissipate heat generated by the rolling friction created when shaft 20 revolves. Since bearing journal 22 is press fit onto shaft 20, it rotates at the same r.p.m. as shaft 20.

Needle bearing 28 is press fit into annular bearing sleeve 34 from the inside of housing 10. Alternator housing 10 has a circular support hole therein designed to receive the slip ring end bearing, 12 as shown in FIG. 1. As stated above, bearing sleeve 34 contains a notch or guide 40 for proper press fit into the support hole 44 of housing 10 so that bearing sleeve 34 is flush with housing 10. When properly inserted, bearing 28 and guide 40 of bearing sleeve 34 will extend through support hole 44 in alternator housing 10. Bearing sleeve 34 will be flush with the inside wall of housing 10. In certain installations, it may be necessary to enlarge the diameter of the support hole 44 in the housing 10 into which the bearing system is inserted.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled. It is possible to eliminate the bearing sleeve by press fitting the needle bearing into the alternator housing.

What is claimed is:

1. An improved bearing system for use in an alternator having an external housing with a support hole, comprising:
    a shaft;
    a bearing journal positioned on the end of the shaft;
    a bearing having an inner surface and an outer surface wherein the inner surface is fit over the bearing journal;
    a bearing sleeve having a guide fixed to the alternator housing;
    said bearing sleeve extends through the support hole in the external housing such that the guide extends beyond the external housing;
    the bearing journal is fitted into the bearing so that the bearing outer surface is in contact with the bearing sleeve fixed in the alternator housing.

2. A bearing system, comprising:
    a bearing journal;
    a needle bearing having an inner surface, an outer surface, and a bottom such that the bearing journal is fitted into the inner surface of the needle bearing and extends to said bottom;
    a bearing sleeve having an inner surface and an outer surface such that the outer surface of the needle bearing is fit into the inner surface of the bearing sleeve and is of the same length as the inner surface of the bearing sleeve.

3. An improved bearing system, comprising:
    an automotive alternator having an external housing and a shaft;
    said external housing having a support hole therein such that said shaft extends into said support hole;
    a bearing journal having an internal diameter of a size to receive said shaft;
    said bearing journal being secured to said shaft such that said bearing journal rotates with said shaft;
    a draw cup needle bearing having a length x, an inner surface, an outer surface, and a bottom;
    a bearing sleeve having a length x, a first end, a second end, a guide;
    said bearing sleeve being secured in said support hole in said external housing such that said guide extends beyond said external housing on said first end of said bearing sleeve and is flush with said external housing on said second end of said bearing sleeve;
    said bearing sleeve having the same length x as said draw cup needle bearing;
    said outer surface of said draw cup needle bearing is fit into said inner surface of said bearing sleeve;
    said bearing journal is fit into said inner surface of said draw cup needle bearing and extends to said bottom.

* * * * *